US012646703B2

(12) United States Patent
Grant et al.

(10) Patent No.: US 12,646,703 B2
(45) Date of Patent: *Jun. 2, 2026

(54) METHODS FOR ALKALIATING ROLL ANODES

(71) Applicant: Nanoscale Components, Inc., Bedford, NH (US)

(72) Inventors: Robert W. Grant, Lecanto, FL (US); Matthew Sweetland, Bedford, MA (US); Asela Maha Acharige, Brookline, NH (US)

(73) Assignee: Nanoscale Components, Inc., Bedford, NH (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/425,990

(22) Filed: Jan. 29, 2024

(65) Prior Publication Data

US 2024/0405190 A1 Dec. 5, 2024

Related U.S. Application Data

(60) Continuation of application No. 17/313,541, filed on May 6, 2021, now Pat. No. 11,916,217, which is a division of application No. 16/157,253, filed on Oct. 11, 2018, now Pat. No. 11,005,088, which is a
(Continued)

(51) Int. Cl.
| | |
|---|---|
| *H01M 4/1393* | (2010.01) |
| *C25D 5/00* | (2006.01) |
| *C25D 5/02* | (2006.01) |
| *C25D 5/18* | (2006.01) |
| *C25D 7/06* | (2006.01) |

| | |
|---|---|
| *H01M 4/04* | (2006.01) |
| *H01M 4/1395* | (2010.01) |
(Continued)

(52) U.S. Cl.
CPC .......... *H01M 4/0452* (2013.01); *C25D 5/022* (2013.01); *C25D 5/18* (2013.01); *C25D 5/611* (2020.08); *C25D 7/0642* (2013.01); *C25D 7/0657* (2013.01); *H01M 4/1393* (2013.01); *H01M 4/1395* (2013.01); *H01M 2004/021* (2013.01); *H01M 10/052* (2013.01)

(58) Field of Classification Search
None
See application file for complete search history.

(56) References Cited

U.S. PATENT DOCUMENTS

| | | |
|---|---|---|
| 5,372,687 A | 12/1994 | Pohto et al. |
| 5,595,837 A | 1/1997 | Koksbang et al. |
| 6,084,796 A | 7/2000 | Kozicki et al. |
(Continued)

FOREIGN PATENT DOCUMENTS

| | | |
|---|---|---|
| FR | 2056971 A1 | 5/1971 |
| JP | 2002367607 A | 12/2002 |
| WO | 2014006470 A | 10/2014 |

*Primary Examiner* — Carlos Barcena
(74) *Attorney, Agent, or Firm* — Elmore Patent Law Group, P.C.; Jia Kang; Carolyn S. Elmore, Esq.

(57) ABSTRACT

The present invention relates to processes that may be used singly or in combination to prevent lithium (or alkali metal) plating or dendrite buildup on bare substrate areas or edges of electrode rolls during alkaliation of a battery or electrochemical cell anode composed of a conductive substrate and coatings, in which the electrode rolls may be coated on one or both sides and may have exposed substrate on edges, or on continuous or discontinuous portions of either or both substrate surfaces.

31 Claims, 9 Drawing Sheets

Roll anode lithiation arrangement shown in reduction mode

602

Roll anode unwind

Roll anode rewind liquid electrolyte level counter electrode (s)

DC Power Supply

Related U.S. Application Data continuation of application No. 15/372,736, filed on Dec. 8, 2016, now Pat. No. 10,128,487.

(60) Provisional application No. 62/265,090, filed on Dec. 9, 2015.

(51) Int. Cl.
H01M 10/052  (2010.01)
H01M 4/02  (2006.01)

(56) References Cited

U.S. PATENT DOCUMENTS

| | | | |
|---|---|---|---|
| 2002/0102462 A1 | 8/2002 | Huggins et al. | |
| 2008/0073217 A1 | 3/2008 | Takezawa et al. | |
| 2011/0038497 A1 | 2/2011 | Chae et al. | |
| 2013/0327648 A1 | 12/2013 | Grant et al. | |
| 2017/0338465 A1 | 11/2017 | Holme et al. | |

Double sided anode coating with disparate bare copper areas

Magnitude of lithium flux due to lower potential of anode active material during reduction at anode Magnitude of lithium flux due to higher potential of the lithium metal
during oxidation  phase

602

Roll anode unwind

Roll anode lithiation arrangement shown
in reduction mode

Roll anode rewind liquid electrolyte level counter electrode (s)

DC Power Supply

Lithiation through field apertures

METHODS FOR ALKALIATING ROLL ANODES

RELATED APPLICATIONS

This application is a continuation of U.S. application Ser. No. 17/313,541, filed on May 6, 2021, which is a divisional of U.S. application Ser. No. 16/157,253, filed on Oct. 11, 2018 (now U.S. Pat. No. 11,005,088), which is a continuation of U.S. application Ser. No. 15/372,736, filed on Dec. 8, 2016 (now U.S. Pat. No. 10,128,487), which claims the benefit of U.S. Provisional Application No. 62/265,090, filed on Dec. 9, 2015. The entire teachings of the above applications are incorporated herein by reference.

BACKGROUND OF THE INVENTION

Graphite is the most common anode material used to make lithium ion batteries. It is usually coated on a copper substrate or foil, but other lithium inactive metals may be used. Graphite offers a reversible capacity of about 370 mAh/gram, and suffers an irreversible capacity loss of about 5% to building a solid electrolyte interphase (SEI) layer. Recently, higher capacity anode materials have been introduced that could greatly increase the specific capacity of the lithium ion battery. For example, amorphous silicon can provide as much as 3500 mAh/gram (Obrovac MN and Krause LJ, 2007. Reversible cycling of crystalline silicon powder. *J. Electrochem. Soc.* 154: A103-A108).

Since anode materials used in lithium ion batteries do not contain lithium initially, cathode materials usually supply all of the lithium used in battery cycling and irreversible cycle loss (IRCL). Unfortunately, silicon exhibits an IRCL of up to 25%. This would mean that 25% of the cycle able capacity of the battery would become unavailable and the expensive and heavy cathode would be underutilized.

There have been attempts to add extra lithium to anode material by: a) adding a thin layer of lithium metal to the cell; b) adding lithium to the anode active material by electrolysis in a non-aqueous and dry environment; c) dispersing lithium into the anode material as in stabilized lithium metal powder, or SLMP (FMC Corporation, Philadelphia, PA); and d) adding lithium donating substances to the battery electrolyte during assembly. U.S. Pat. No. 8,133, 374 B2 is referenced here as a partial review of some of these methods. U.S. Ser. No. 14/590,573 filed Jan. 6, 2015, published as US Publication No. 2015019184 on Jul. 9, 2015 entitled Method of Alkaliating Electrodes by Grant et al., is incorporated by reference in its entirety and for details of a process and an apparatus for electrochemical lithiation.

For anode rolls in commercial environments, it is desirable that some portion of substrate be uncoated in order to accommodate subsequent cell assembly methods, such as tab welding, slitting, or for other purposes. An anode roll is defined as an anode material which is of sufficient length to roll. FIG. 1 shows edge view of a common anode substrate 101 with a coating 102 where bare copper areas are present on both faces of the substrate in order to facilitate a spiral wound cell packaging technique. In another situation, the bare copper may be exposed on one or both edges 103 of the roll to accommodate the welding of cells constructed with cut, stacked electrode sheets. In yet another case, it may be desirable to use wide anode rolls (e.g. 30-60 cm) for efficient production of small cells for consumer electronics devices. In such a case, interior surfaces of these larger anode rolls would contain many bare copper areas in rows or columns, and the exterior or edges might also need to be protected. In all these cases, any bare substrate area needs to be protected from lithium metal buildup during the electrochemical lithiation of the anode roll. If these and other configurations could be processed roll to roll, then mass production could be realized.

U.S. Pat. No. 8,133,374 B2 teaches a way to use electrolysis to lithiate an anode substrate where a reference electrode detects areas of bare copper in order to "turn off" the current while the bare copper area is passing. It does not teach how this can be done on an anode coated on both sides, and hence is impractical for most commercial purposes in which anode rolls are double-sided. It also does not teach how to avoid lithium plating or dendrite buildup on the edges of a substrate. Since field strength concentrates on the substrate edges in an electrolysis bath, U.S. Pat. No. 8,133, 374 B2 is impractical in that it does not protect the edges.

SUMMARY OF THE INVENTION

The present invention relates to electrochemical processes that produce alkaliated anodes characterized by bare substrate areas free of alkali metals, which may be used singly or in combination to prevent lithium (or alkali metal) plating or dendrite buildup on bare substrate areas or edges of electrode rolls during alkaliation of a battery or electrochemical cell anode composed of a conductive substrate and coatings, in which the electrode rolls may be coated on one or both sides and may have exposed substrate on edges or on continuous or discontinuous portions of either or both substrate surfaces. Other areas free of an alkaliation coating according to any of the processes of the invention have exposed conductive substrate, and comprise the perimeter of the anode and/or a band perpendicular to and connecting the perimeters of the anode. Details of solutions and apparatus are described in U.S. application Ser. No. 13/688,912, which is incorporated herein by reference. In one embodiment the coating is an alkaliation coating, wherein an alkaliation coating is any coating for receiving alkaliation ions, said coating preferably being comprised of graphite or silicon or a combination thereof.

Deposition of alkali metal on bare or exposed conductive substrate during production of alkaliated anodes can occur. A process to prevent lithium (or alkali metal) plating or dendrite buildup on coated electrodes comprising bare substrate areas is the forward/reverse current method. A conductive substrate coated on at least one side is held in a non-aqueous electrolyte solution containing lithium (or alkali metal) salt. Conductive substrate coatings are comprised of an active material layer capable of absorbing and releasing lithium ions. Coatings may preferably be graphite or other forms of carbon, or silicon, tin or the like, or combinations thereof, and the coating area is preferably discontinuous on the substrate. Such materials can exert the effect of the present invention regardless of whether such a material is any of an elemental substance, an alloy, a compound, a solid solution and a composite active material containing a silicon-containing material or a tin-containing material. The bare or exposed areas can be the substrate edges, any surface margins or any inner areas on either or both surfaces, and bare areas can be patterned to facilitate cutting the sheet to smaller anode materials, or to leave areas for welding. For example, the bare areas can be regularly striped across the width of the substrate or along the length of the substrate roll. A method for manufacturing a coated electrode is presented.

The working counter electrode can be connected to the positive side of a power D.C. power supply. The conductive substrate can be connected to the negative side of the power supply. A current is passed between the working electrode and the conductive substrate through the electrolyte solution volume between the electrodes. This produces an oxidizing current at the working electrode and a reducing current at the conductive substrate. This reducing current at the conductive substrate provides for the lithium deposition on the coated electrode and the exposed substrate. The reducing current is interrupted periodically and forced to reverse (oxidizing current) with a short duration with respect to the reducing current duration. In this way, lithium that deposits on the bare conductive substrate, such as on a copper conductive substrate, during the reducing current phase is removed during the oxidizing phase. This technique works well on interior and exterior bare conductive substrate areas, such as on a bare copper conductive substrate, regardless of their position within the anode substrate roll. The oxidizing current at the anode surface will favor lithium removal from exposed substrate areas compared to coated areas due to the larger electro-chemical potential of plated lithium compared to intercalated lithium. By lithiating the whole electrode in this way, with current reversal favoring the removal of lithium from the bare substrate surfaces and edges, the amount of lithium to compensate for IRCL (or for other purposes) can be controlled and successfully pre-alloyed or pre-intercalated into the electrode active material prior to cell assembly. Subsequent steps of cell assembly are made safer and practical due to clean, lithium-free areas for welding, slitting or other purposes.

It is understood that the terms "lithiate" or "lithiation" are more specific cases of the general terms "alkaliate" or "alkaliation." In other words, it is to be understood that where the term "lithiate" or "lithiation" is used in the specification, an alternative embodiment includes "alkaliate" or "alkaliation" and vice versa.

A second process to prevent lithium (or alkali metal) plating or dendrite buildup on bare substrate areas and edges of coated electrodes during alkaliation of a battery or electrochemical cell anode, in which the electrode may be coated on one or both sides, is the rest period method. The rest period method comprises forward (reducing) voltage pulses alternating with zero voltage pulses (rest period), the process continuing over extended cycles of alternating forward voltage pulses and zero voltage pulses. The rest period method may be performed alone, or in combination with the forward/reverse current method.

A third process to prevent alkali metal plating on bare substrate areas and edges of coated electrodes during alkaliation of a battery or electrochemical cell anode, in which the electrode may be coated on one or both sides, is the edge guard method. Edge guards are constructed of a dielectric material that is compatible with the solvent used, and are mounted above and below each exposed edge of the roll anode to prevent alkaliation of bare substrate edges. The edge guard method may be performed using the rest period method, the forward/reverse current method, the rest period method in combination with the forward/reverse current method, or with only forward (reducing) current and no rest period.

DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
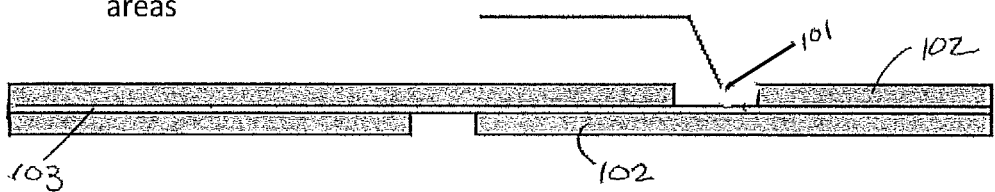
FIG. 1. Illustration of double sided anode coating with bare copper areas.

The present invention relates to methods for alkaliation of an anode to prevent alkali metal plating or dendrite buildup on bare substrate areas or edges of the anode's conductive substrate, wherein the anode comprises an electrode or electrode roll. In one embodiment, a bare substrate area is located along the edges of the anode's conductive substrate. Anodes can be comprised of lithium-active material coated on a conductive substrate such as copper, nickel, etc. In one embodiment, anodes are lithium-intercalating anodes. Examples of materials that comprise lithium-intercalating anodes include but are not limited to carbon and graphite, tin oxide, silicon, silicon oxide, polyvinylidene difluoride (PVDF) binder, and mixtures thereof. In a further embodiment, lithium-intercalating anode materials are selected from graphite, cokes, and mesocarbons. Alternatively, a lithium alloying material can be deposited or plated, etc. on a conductive substrate. In one embodiment, the alloying materials include but are not limited to tin, aluminum, silicon or germanium. For purposes of the description only, the roll of coated conductor material or the roll of active alloying material will be referred to as the roll anode.

In one embodiment, the invention relates to an electrochemical process to alkaliate an anode to produce an alkaliated anode characterized by bare substrate areas free of alkali metals comprising the steps of:
  a. Subjecting an anode to a non-aqueous electrolytic solution comprising an alkali metal salt, wherein said anode comprises a conductive substrate comprising at least one surface characterized by at least one area having an alkaliation coating thereon and at least one area that is free of an alkaliation coating;
  b. Applying a forward reducing current to alkaliate the anode for a time sufficient to at least partially alkaliate the anode in the areas having an alkaliation coating;

c. Maintaining the anode produced by step (b) in the solution and, optionally, applying a reversed oxidative current to remove any alkali metal deposits from the bare substrate areas; and d. Repeating steps b and/or c.

In one embodiment, steps b and c are repeated at least about two times. In a preferred embodiment, steps b and c are repeated at least about three times. In a more preferred embodiment, steps b and c are repeated at least about five times, at least about ten times or, more preferably, at least about 20 times. In a further embodiment, the anode is maintained in at least one step c in the substantial absence of current for a time sufficient to permit diffusion of at least some of the alkali metal into the alkaliation coating.

A method for manufacture of a coated electrode comprises the steps of cleaning the surfaces of a conductive substrate; coating a slurry with the active material onto one side of the substrate in a continuous or dis-continuous pattern; drying the first side of the coated material; coating the second side of the conductive substrate with the active material in a continuous or dis-continuous pattern; drying the second side of the coated material; calendaring and slitting the coated conductive substrate into final shape and size.

The roll anode is directed through an electrochemical tank composed of at least one counter electrode, a non-aqueous solution containing an alkali metal salt, and rollers to guide and complete the circuit to the roll anode. Non-aqueous solutions comprise an organic solvent(s) added to an electrolyte which serves the purpose of solvating the inorganic ion salt. Typical examples of a non-aqueous solvents are butylene carbonate, propylene carbonate, ethylene carbonate, vinylene carbonate, vinyl ethylene carbonate, dimethyl carbonate, diethyl carbonate, dipropyl carbonate, methyl ethyl carbonate, acetonitrile, gamma-butyrolactone (GBL), triglyme, tetraglyme, dimethylsulfoxide, dioxolane, sulfolane, room temperature ionic liquids (RTIL) and mixtures thereof. In one embodiment, a non-aqueous solvent is selected from ethylene carbonate, vinylene carbonate, vinyl ethylene carbonate, GBL, and mixtures thereof. In a second embodiment, a non-aqueous solvent is GBL. The term alkali metal salt refers to an inorganic salt which is suitable for use in a non-aqueous solvent. Examples of suitable alkali metal cations comprising an alkali metal salt are those selected from $Li^+$, $Na^+$, $K^+$, $Rb^+$, $Cs^+$, $Fr^+$, and mixtures thereof. Examples of suitable halogen anions comprising an alkali metal salt are those selected from $F^-$, $Cl^-$, $Br^-$, $I^-$, and mixtures thereof. In one embodiment, the alkali metal salt is selected from LiF, LiCl, LiBr, NaF, NaCl, NaBr, KF, KCl, KBr, and mixtures thereof. Other salts such as $LiNO_3$ may be used, but in the preferred embodiment, the alkali metal salt is the halide LiCl.

At sufficiently low current densities, lithiation of active anode material will occur without plating bare substrate areas. There is enough electrochemical potential difference between the lithiation potential of bare substrate and anode-active material at low current densities to avoid deposition of lithium metal on the bare copper areas. In one embodiment, the reduction phase is at low current densities under 0.1 $mA/cm^2$.

Figure 2:
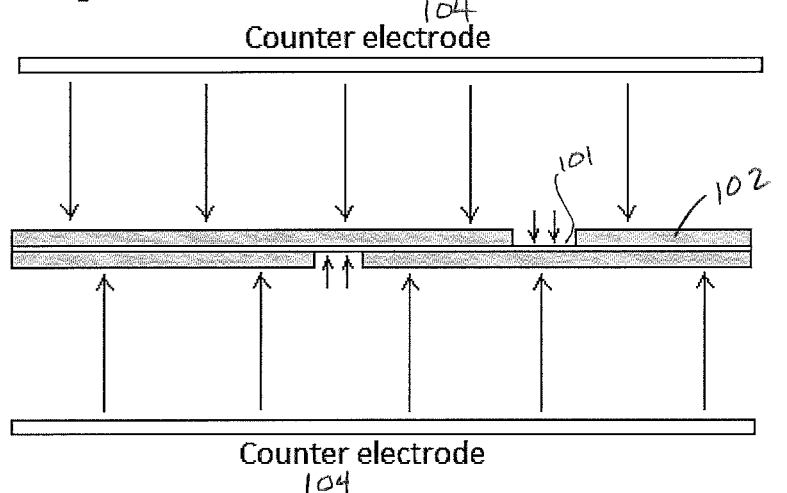
FIG. 2. Illustration of lithium flux magnitude during reduction phase at anode.

However, at practical current densities for manufacturing, "over-potential" becomes necessary. This over-potential is enough when added to the anode lithiation theoretical voltage to deposit lithium metal onto the bare substrate areas and edges, even after one lithiation step, wherein a forward reducing current to alkaliate the anode is applied for a time sufficient to at least partially alkaliate the anode in the areas having an alkaliation coating. In other words, "over-potential" is intended to mean the voltage sufficient to cause lithium or alkali metal deposition, or plating, onto the bare substrate, in addition to lithiation of the coated substrate, during step (b) above. This is illustrated in FIG. 2 where the arrows depict the relative magnitude of lithium deposition on the coated substrate 102 and uncoated substrate 103. Also shown in FIG. 2 are the counter electrodes 104. In one embodiment, the reduction phase (e.g., step (b)) is performed at a current between 0.1 $mA/cm^2$ and 10 $mA/cm^2$. In another embodiment, the reduction phase is performed at a current between 0.5 $mA/cm^2$ and 3.0 $mA/cm^2$. In a more preferred embodiment, the reduction phase is performed between 1.0 $mA/cm^2$ and 1.4 $mA/cm^2$.

Figure 3:
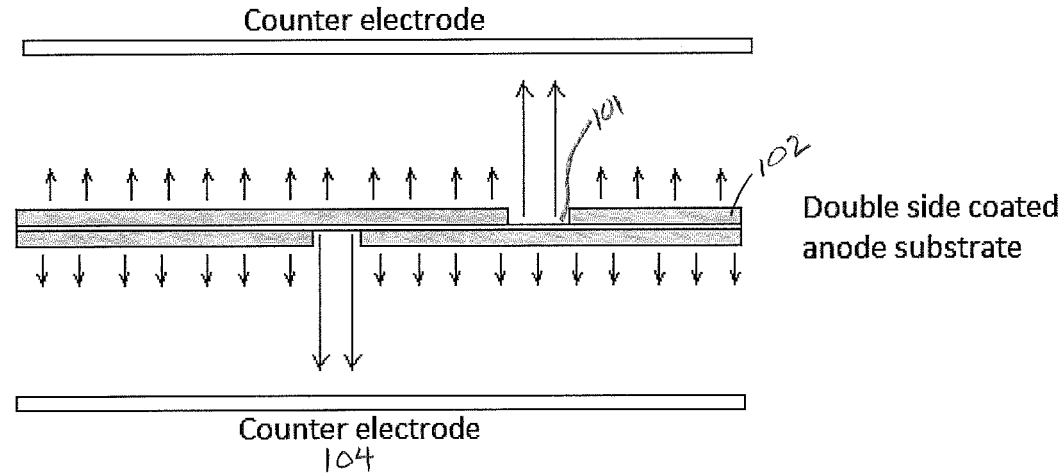
FIG. 3. Illustration of lithium flux magnitude during oxidation phase at anode.

Lithium metal plated on bare copper areas in this manner can be removed with little impact on lithiated anode-active material. Flux magnitudes during the anode oxidation (reversal) phase can favor the loss of lithium from lithium-plated metal areas (corresponding to the uncoated substrate 101) over loss from the anode-active material (corresponding to the coated substrate 102). FIG. 3. During anode oxidation, some lithium ions are removed from the anode-active material, but the lithium-plated metal areas are favored due to their larger potential (−3.0 volts with regard to a hydrogen reference) compared to the potential of intercalated lithium (−2.8 volts with regard to a hydrogen reference) in the anode active material, illustrated by the arrow size. In one embodiment, the oxidation phase is performed at a current between 0.1 $mA/cm^2$ and 2.4 $mA/cm^2$. In a preferred embodiment, the oxidation phase is performed between 0.1 $mA/cm^2$ and 1.2 $mA/cm^2$. In an even more preferred embodiment, the oxidation phase is performed between 0.1 $mA/cm^2$ and 0.8 $mA/cm^2$. In a most preferred embodiment, the oxidation phase is performed at 0.6 $mA/cm^2$.

Figure 8:
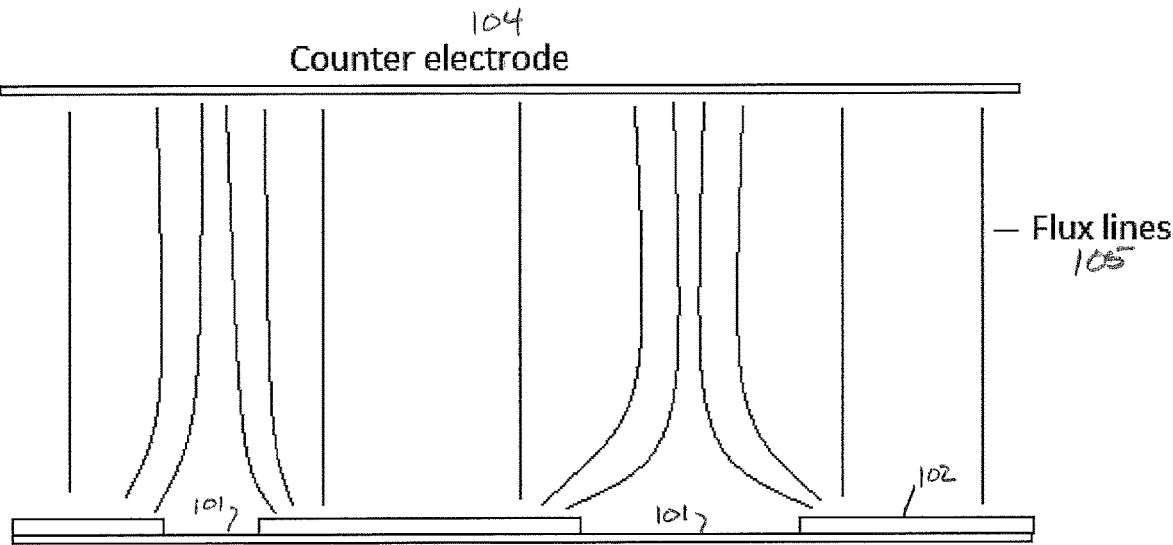
FIG. 8. Illustration of flux lines between counter electrode and roll anode as a function of lower electrochemical potential of the coated anode material.
Figure 9:
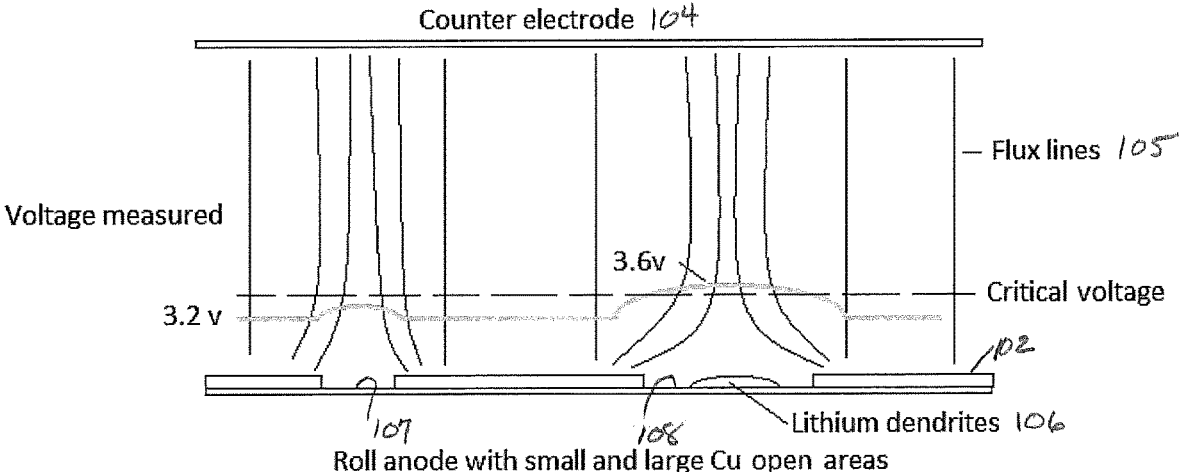
FIG. 9. Illustration of lithium dendrite formation as a function of overvoltage and dimension of the open copper area.

The magnitude of forward and reverse current densities and durations will be affected by the scale of the bare substrate areas and counter electrodes. For the sake of example, a LiCl electrolyte source will oxidize chlorine evenly across a carbon counter electrode. Due to the lower electrochemical potential of the coated anode material, $Li^+$ ions flow toward the anode active material as shown in FIG. 8, depicted with flux lines 105. The voltage profiles across the various open copper areas are affected. In the example shown in FIG. 9, a voltage profile over two open copper areas is recorded, at 7 mm above the surface. The electrochemical cell is 2 cm deep, and the small copper area 107 is 5 mm and the large copper area 108 is 6 mm wide. As soon as the voltage exceeds a critical voltage, e.g., −3.2 V vs. Ag/AgCl, $Li^0$ will begin to form on copper. In other words, the "critical voltage" is the voltage required to cause lithium deposition on the bare substrate. By observation, the center region of the larger open copper area shows the first signs of alkali metal deposits in the form of lithium dendrites 106. The smaller area remained clear in this example.

Typically, the duration ratio of forward current to reversed current is about 8:1. In one embodiment, ratios of forward current (reducing) duration to reversed current (oxidizing) duration are fixed, and between 5:1 and 20:1. In a more preferred embodiment, the fixed ratio is 8:1. Accordingly, examples of forward to reversed currents include, but are not limited to, a fixed forward current of 1.4 $mA/cm^2$, and a fixed reversed current of 0.6 $mA/cm^2$; a fixed forward current of 1.2 $mA/cm^2$, and a fixed reversed current of 0.2 $mA/cm^2$.

The sum of the combined durations of one forward (reducing) current pulse and one reverse (oxidizing) current pulse represents one cycle. The cycles can be repeated continuously or discontinuously. Cycles can be between 1 nanosecond and 2 hours in length. Preferred cycle lengths include between 1 microsecond and 60 minutes, between 1 millisecond and 30 minutes, between 1 centisecond and 10 minutes, and between 1 second and 6 minutes. In one embodiment, the cycle times are selected from between 1 to 6 minutes.

Depending on the over voltage and the duration (i.e. length of time, or pulse period) of the forward or reducing currents, lithium will deposit on the exposed, uncoated or bare, substrate areas and edges. Reversal currents can remove (via oxidation from $Li^0$ to $Li^+$) these deposits. The durations of pulse periods during the reduction and oxidizing phases are important since deposits can be inhibited or limited by using shorter pulse periods during the reduction phase. This will shorten the time required during the oxidation phase and will help to increase the throughput of the process. In one embodiment, the pulse period duration of a reduction phase sufficient to at least partially alkaliate the anode in the areas having an alkaliation coating is between 1 nanosecond and 1 hour in length. Preferred pulse periods are between 1 microsecond and 30 minutes, between 1 millisecond and 15 minutes, between 1 centisecond and 5 minutes, between 1 second and 3 minutes, and between 1 second and 1 minute. In a second embodiment, the pulse period duration of an oxidizing phase is between 1 nanosecond and 1 hour in length. Preferred pulse periods are between 1 microsecond and 30 minutes, between 1 millisecond and 15 minutes, between 1 centisecond and 5 minutes, between 1 second and 3 minutes, and between 1 second and 1 minute.

In a further embodiment, the duration of a reverse (oxidizing) current pulse is sufficient to remove alkali metal deposits and dendrites from the anode conductive substrate in any areas and edges free of an alkaliation coating is between 1% and 100% the duration of the forward (reducing) current pulse, between 1% and 40% the duration of the forward (reducing) current pulse, between 5% and 30% the duration of the forward (reducing) current pulse, or between 5% and 20% the duration of the forward (reducing) current pulse. In a preferred embodiment, the duration of a reverse (oxidizing) current pulse is 15% or 20% the duration of the forward (reducing) current pulse. In another embodiment, the duration of the reverse (oxidizing) current pulse is between 10% and 15% the duration of the forward (reducing) current pulse. In one embodiment, the forward and reverse currents are supplied as DC. In a second embodiment, the forward and reverse currents are supplied as AC. The methods of the invention allow for the use of both AC and DC.

Figure 4:
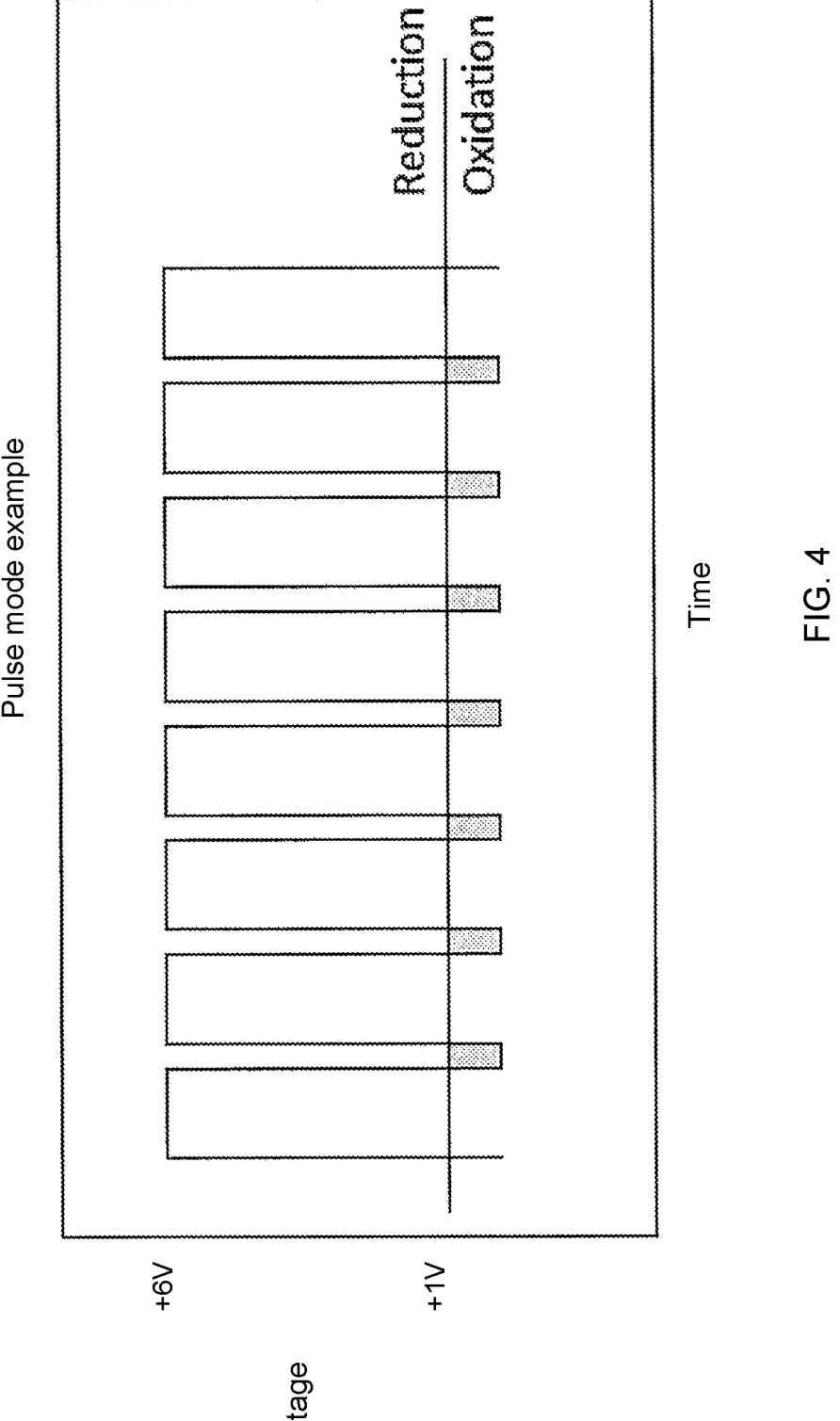
FIG. 4. Illustration of voltage magnitudes during oxidation and reduction pulse periods at 1 mA/cm$^2$.

By way of further example, reducing current produced by a power supply, such as a Kiethley model 2220-30-1 dual channel, can be applied to the anode in such a way as to intercalate the lithium. A first channel is operated with a current density of between 0.5 mA/cm² and 2.0 mA/cm² of roll anode in the reduction pulse, for between 1 nanosecond and 1 hour in length. In one embodiment, a first channel is operated with current density of 1 mA/cm² for 60 seconds, then a second channel is operated at 0.6 mA/cm² in the reverse (oxidizing) current direction for 10% of the reduction pulse period (FIG. 4; 6 seconds). Shorter or longer periods may be controlled by a timing circuit.

During the reduction phase at this current (e.g. 1 mA/cm²), the voltage of operation becomes about 6 volts (FIG. 4). In the reverse current mode, the voltage becomes about 1 volt. These voltages are governed by the dissociation of salt in the lithiation phase (reduction on the anode) and oxidation of $Li^0$ to $Li^+$ on the copper during the reversal or de-lithiation phase. The resulting voltages must also be limited within the range of the electrolyte solvent (e.g. less than 7 volts).

Various speeds and durations of electrode movement can be used during the forward/reverse current method. In general, speeds and durations will vary with desired lithiation dosages, machine size, and active anode rate characteristics. Preferred speeds are between 0.02 meter/minute and 12 meters/minute. More preferred speeds are between 0.1 meter/minute and 3 meters/minute. Preferred time durations of electrode lithiation are between 10 minutes and 500 minutes. More preferred time durations are between 60 minutes and 120 minutes.

The pre-lithiated roll anode is rinsed with pure solvent to remove residual salt content, rewound, and then optionally dried of solvent in a vacuum oven. The pre-lithiated roll anode is then cut into shapes for wind up, pouch or prismatic cell assembly in a dry environment.

By lithiating the whole electrode in this way, with current reversal removing any lithium metal deposits on the bare substrate surfaces and edges, the appropriate amount of lithium to compensate for IRCL (or for other purposes) can be successfully pre-alloyed or pre-intercalated into the electrode active material prior to cell assembly. Subsequent steps of cell assembly are made safer and practical due to clean, lithium-free areas for welding, slitting or other purposes.

The rate and duration of the reverse current steps can be modified throughout the lithiation process to obtain a faster throughput and shorten the overall process lithiation duration time. This can also serve to protect any exposed substrate surfaces from excess oxidation/corrosion during the early phases of lithiation. During the initial phases of lithiation (e.g. $1^{st}$ 20% of total target dosage), reverse currents can actually be damaging to the exposed substrate due to oxidation of the substrate itself. In the initial phase, the required overvoltage to intercalate lithium into the active anode material is lower than the overvoltage required to intercalate lithium as the dosage of the total intercalated lithium increases. This lower overvoltage requirement reduces, and can even eliminate, the plating of lithium on exposed substrate surfaces. If the anode roll is exposed to current reversal at this point, then the oxidation at the substrate surface may cause oxidation of the substrate material instead of removal of lithium. This oxidation may cause corrosion and mechanical failure of the substrate or will result in electrical isolating films to be generated at the substrate/active anode material interface which will reduce operating efficiency of the finished lithium ion cells.

Figure 5:
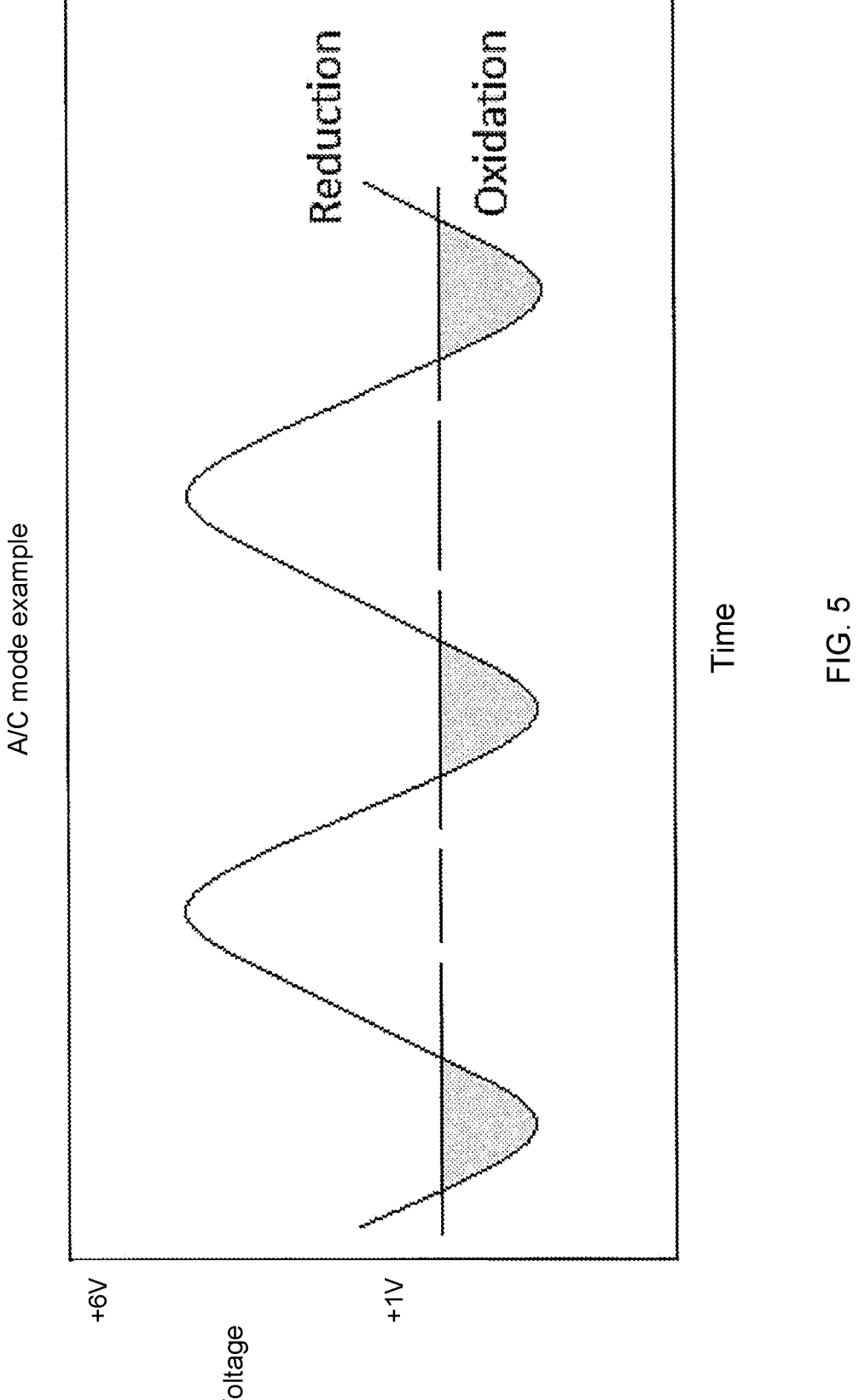
FIG. 5. Illustration of voltage magnitudes during oxidation and reduction pulse periods at 1 mA/cm$^2$ using an AC source.

To prevent this from happening, the time ratio and the forward/reverse current ratio can be modified throughout the duration of the overall pre-lithiation process. In one embodiment, the forward/reverse time duration ratio for the entire process may remain constant or fixed at 8:1, but the current density for the reverse cycle may increase as total dosage increases from zero to 0.6 mA/cm² while the forward current density remains constant or fixed at 1.2 mA/cm² for the entire process. In another embodiment, the forward/reverse current density ratio may remain fixed or constant throughout the overall pre-lithiation process, while the reverse/forward time duration ratio may increase from zero to some predetermined value, say 1:8. These two embodiments may also be combined where the reverse current density increases over with total dosage and the reverse/forward time duration ratio also increases with total dosage. These methods protect the exposed substrate from surface oxidation while increasing the effective average forward current rate compared to either constant time duration ratios or constant forward/reverse current ratios. An AC source can be used also if there is a biasing voltage applied so that a reducing state is applied most of the time (FIG. 5).

In some cases where short pulse periods are used during the reduction phase, lithium deposition on bare substrate areas and edges is eliminated by using only a rest step instead of current reversal. In this case, the short charge transfer to the diffused lithium discourages the formation of loose lithium metal morphology on the surface of the substrate. For use of short pulses, a pulse power supply, such as Model DuPR10-1-3 made by Dynatronix, can be used. The rest period method comprises forward (reducing) voltage pulses alternating with zero voltage pulses (rest periods), the process continuing over extended cycles of alternating forward voltage pulses and zero voltage pulses. For example, using the rest period method with the Dynatronix Model DuPR10-1-3, forward (reducing) voltage pulses can be between 4V for Vmax and +100V for Vmax. More preferred forward voltage pulses are between 4V for Vmax and 8V for Vmax. Preferred durations of forward (reducing) voltage pulse periods sufficient to at least partially alkaliate the anode in the areas having an alkaliation coating are between 2 milliseconds and 1000 milliseconds. More preferred durations of voltage pulse periods are between 10 milliseconds and 800 milliseconds. Even more preferred durations of voltage pulse periods are between 100 milliseconds and 500 milliseconds. Preferred durations of zero voltage pulse periods (rest periods) are between 2 milliseconds and 1000 milliseconds. More preferred durations of zero voltage pulses are between 10 milliseconds and 800 milliseconds. Even more preferred durations of zero voltage pulses are between 100 milliseconds and 500 milliseconds.

The total duration of combined repeating cycles of forward voltage pulses and zero voltage pulses is between 1 minute and 1000 minutes. A more preferred duration of repeating cycles is between 10 minutes and 500 minutes. An even more preferred duration of repeating cycles is between 30 minutes and 100 minutes. The cycles can be repeated continuously or discontinuously.

To determine lithium capacity of a sample, the sample is mounted against a separator and lithium foil to form a half cell. After soaking in electrolyte for 24 hours, a current is applied to de-lithiate the sample to a few volts above lithium, such as 0.5, 1.0, 1.5, 2.0, 2.5, and 3.0 volts above lithium. Preferred current densities are between C/5 and C/30. More preferred current densities are between C/10 and C/20.

The present invention also provides for the prevention of lithium (or alkali metal) deposition on bare surfaces or edges of electrode roll anodes. Embodiments include the use of edge guard apertures, dielectric field apertures, or shields mounted above and below each exposed edge of the roll anode.

In one embodiment, the invention relates to an electrochemical process to alkaliate an anode comprising the steps of:

a. Positioning edge guard apertures, dielectric field apertures, or shields above and below each exposed edge of the anode;
  b. Subjecting an anode to a non-aqueous electrolytic solution comprising an alkali metal salt, wherein said anode comprises a conductive substrate comprising at least one surface, an alkaliation coating on the at least one surface; and c. Applying a forward reducing current through the solution to alkaliate the anode.

The edge guards or field apertures are constructed of dielectric material that is compatible with the solvent used. In the case of GBL solvent, the guards are made of polyethylene. Other compatible plastics or material such as ceramics may also be used if they are compatible with the solvent and offer the same level of field reduction. The amount of field reduction is determined by surveying the resultant dosage on the substrate or anode roll edges or bare features. The local electric field is reduced in the area between the shield and the anode roll and therefore lower dosage or lithium plating can take place in this area. The edge guard method may be performed using the rest period method, the forward/reverse current method, the rest period method in combination with the forward/reverse current method, or with only forward (reducing) current and no rest period. Advantages of the edge guard method include faster processing time, reduced costs, and excellent application to alkaliation of electrodes, wherein bare substrate is present only near or along the edges of the anode.

According to all the methods of the invention, net dosages achieved are between 0.1 mAh/cm$^2$ and 10 mAh/cm$^2$.

EXAMPLES

Example 1. Using Forward/Reverse Method Following Rest Period Method

Figure 6:
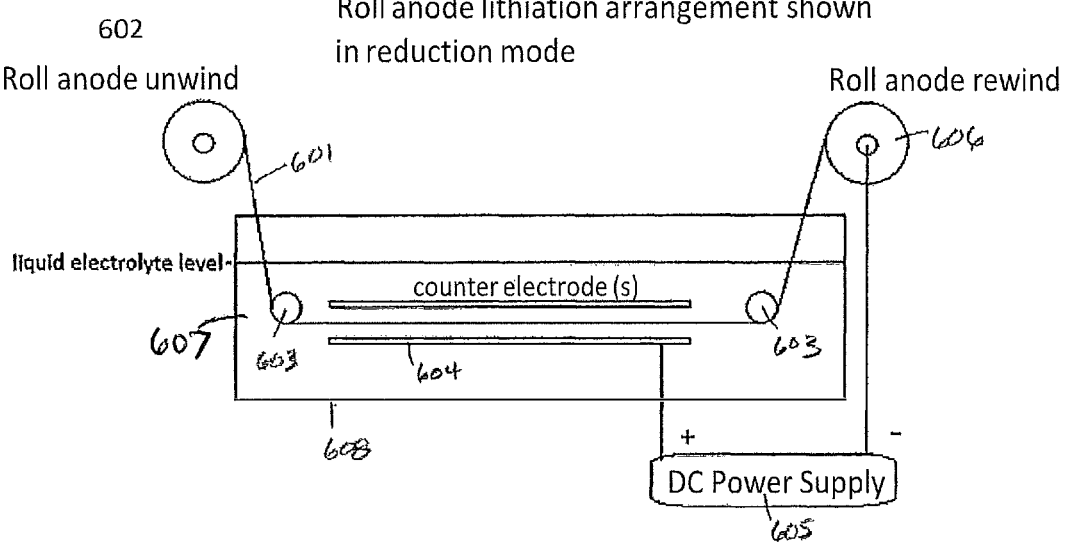
FIG. 6. Illustration of roll anode arrangement in reduction mode. The roll anode 601 is removed from the roll anode unwind 602, directed into a tank 608 containing the liquid electrolyte 607, between the counter electrodes 604, which are operably connected to a power supply 605, and returned to the roll anode rewind 606. Rollers 603 assist in directing the anode.

A 4.6×3.2 cm$^2$ area anode electrode, coated in a pattern with a graphite-silicon blend on both sides of a copper substrate so that a 0.5 cm margin was bare on the one long edge of each side (approximately 10% bare copper), was mounted in a frame and placed between counter electrodes using 2 cm spacing. A GBL solvent and 0.5M LiCl salt solution held at 25° C. enveloped the electrodes. Carbon dioxide was bubbled through the solution. Using a Maccor 4200 battery tester, a forward (reducing) current density of 0.9 mA/cm$^2$ was produced for 150 seconds exhibiting a cell voltage of +6 V (FIG. 6). This pulse was immediately followed by a rest period for 30 seconds producing a cell voltage of 0 V. At the early stages of pre-lithiation, there is a minimum amount of intercalated Li in the anode and therefore current reversal was not yet introduced. Forward/rest pulses were carried out for 4 consecutive cycles before introducing forward/reverse pulse method. The rest period was then substituted with a current reversal (oxidation) pulse with a current density of 1.0 mA/cm$^2$ for a 30 second period using a Maccor 4200 battery tester. The forward and reverse currents or pulses were repeated continuously until the desired dosage was achieved while inhibiting any lithium deposition on the bare copper areas. This method produces pre-lithiated anodes with bare Cu areas that do not contain Li$^0$ metal particles.

Example 2. Using Rest Period Method

A 4.6×3.2 cm$^2$ area anode electrode, coated in a pattern with a graphite-silicon blend on both sides of a copper substrate so that a 0.5 cm margin was bare on the one long edge of each side (approximately 10% bare copper), was mounted in a frame and placed between counter electrodes using 2 cm spacing. A GBL solvent and 0.5M LiCl salt solution held at 25° C. enveloped the electrodes. Carbon dioxide was bubbled through the solution. Forward (reducing) currents and rest periods were produced with the use of the previously mentioned Dynatronix (DuPR10) power supply. The pulses were defined as +6 V for Vmax with a duration of 500 milliseconds (reducing), and rest period of 500 milliseconds at 0 V. These pulses were repeated continuously for 90 minutes. This method produces pre-lithiated anodes with bare Cu areas with no $Li^0$ metal particles. A 2.5 $cm^2$ electrode sample was cut and mounted against separators and lithium foil to form a half cell. After soaking in electrolyte for 24 hours, a current density of 0.20 $mA/cm^2$ was applied to de-lithiate the sample to 0.9 V above lithium to determine the pre-lithiated lithium capacity of the sample. According to the method, the dosage produced was approximately 1.5 $mAh/cm^2$, and the bare copper areas were clear of deposited lithium.

Example 3. Varying Forward/Reverse Current Ratios

A 6 cm wide copper substrate, 5 cm of which are coated on both sides with a graphite-silicon blend, was placed between counter electrodes using two centimeter spacing. A GBL solvent and 0.5M LiCl salt solution held at 25 degrees C. enveloped the electrodes. Carbon dioxide was bubbled through the solution. Total process time was 90 minutes. For the first 25% of the process time, a forward (reducing) current of 1.2 $mA/cm^2$ was produced for 155 seconds. This pulse was immediately followed by a reverse current of 0.15 $mA/cm^2$ for a duration of 25 seconds. For the second 25% of the process time, a forward (reducing) current of 1.0 $mA/cm^2$ was produced for 155 seconds. This pulse was immediately followed by a reverse current of 0.3 $mA/cm^2$ for a duration of 25 seconds. For the third 25% of the process time, a forward (reducing) current of 1.0 $mA/cm^2$ was produced for 155 seconds. This pulse was immediately followed by a reverse current of 0.6 $mA/cm^2$ for a duration of 25 seconds. For the last 25% of the process time, a forward (reducing) current of 1.0 $mA/cm^2$ was produced for 155 seconds. This pulse was immediately followed by a reverse current of 0.8 $mA/cm^2$ for a duration of 25 seconds. The forward and reverse currents or pulses were repeated continuously until the desired dosage was achieved while inhibiting any lithium deposition on the bare copper areas. In this example, the speed of the electrode movement was about 113 cm/hr. A sample was cut and mounted against a separator and lithium foil to form a half cell. After soaking in electrolyte for 24 hours, a current of 0.25 $mA/cm^2$ was used to de-lithiate the sample to 2 volts above lithium to determine the lithium capacity of the sample. The net dosage was about 0.62 $mAh/cm^2$ and the bare copper areas were clear of deposited lithium.

Example 4. Edge Guard Protection

Figure 7:
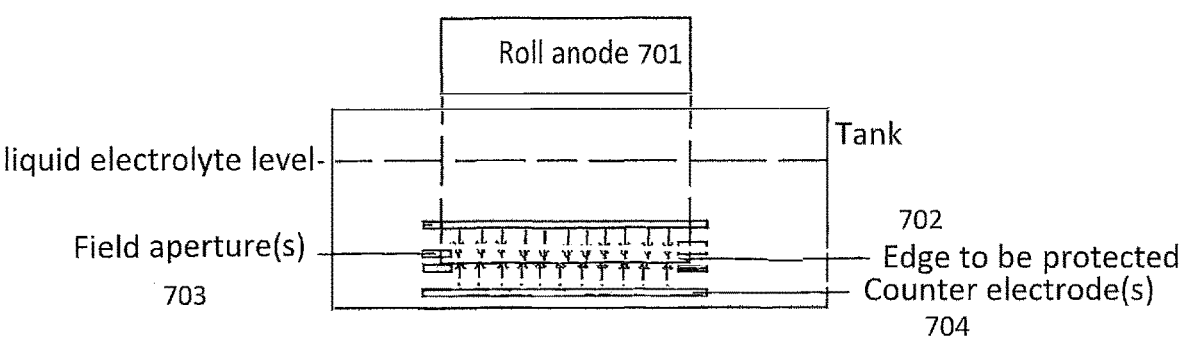
FIG. 7. Illustration of lithiation of roll anode through dielectric field apertures.

A 6 cm wide roll 701 of copper substrate, 5 cm of which was coated on both faces with a graphite-silicon composition so that a 1 cm uncoated margin remained on one edge of the copper 702, was placed between counter electrodes using two centimeter spacing. A high density polyethylene edge guard 703 was mounted along the face of the active counter electrode 704 originating from the edge of the frame extending to the copper to coating transition covering the bare copper, as shown in FIG. 7. A GBL solvent and 0.5M LiCl salt solution held at 25 degrees C. enveloped the electrodes. Carbon dioxide was bubbled through the solution. A forward (reducing) current of 1.2 $mA/cm^2$ was produced for 116.4 minutes. The desired lithiation dosage was achieved in the coated area as determined by subsequent half cell testing. Protection of the bare copper surfaces from lithium deposition was visually observed during pre-lithiation and was confirmed subsequently by placing distilled water on the bare copper edge and finding no visible reaction of the water with lithium.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims. It will also be understood that none of the embodiments described herein are mutually exclusive and may be combined in various ways without departing from the scope of the invention encompassed by the appended claims, and that the invention will include all embodiments falling within the scope of the appended claims.

What is claimed is:

1. An electrochemical process to alkaliate an anode comprising the steps of:
   a. Positioning edge guard apertures, dielectric field apertures, or shields above and below each exposed edge of the anode;
   b. Subjecting an anode to a non-aqueous electrolytic solution comprising an alkali metal salt, wherein said anode comprises a conductive substrate comprising at least one surface, an alkaliation coating on the at least one surface; and
   c. Applying a forward reducing current through the solution to alkaliate the anode.

2. The process of claim 1, wherein the edge guard apertures, dielectric field apertures, or shields are comprised of a dielectric material that is compatible with the non-aqueous electrolytic solution.

3. The process of claim 2, wherein the alkaliated anode achieves a dosage of between 0.1 $mAh/cm^2$ and 10 $mAh/cm^2$, and exhibits no alkali metal deposits.

4. The process of claim 3, wherein the dielectric material is polyethylene.

5. The process of claim 2, wherein the process further comprises a step of:
   d. Maintaining the anode produced by step (c) in the solution and, optionally, applying a reversed oxidative current to remove any alkali metal deposits from the bare substrate areas.

6. The process of claim 5, wherein the forward reducing current and the reversed oxidative current are DC.

7. The process of claim 5, wherein the forward reducing current and the reversed oxidative current are AC.

8. The process of claim 5, wherein the ratio of the reverse and forward current is fixed.

9. The process of claim 5, wherein the ratio of the reverse and forward current increases.

10. The process of claim 5, wherein the ratio of the reverse and forward time duration is fixed.

11. The process of claim 5, wherein the ratio of the reverse and forward time duration increases.

12. The process of claim 5, wherein the forward reducing current is between 1 and 8 times greater than the reversed oxidative current.

13. The process of claim 5, wherein the forward reducing current is about 2 times greater than the reversed oxidative current.

14. The process of claim 5, wherein the reversed oxidative current density is between 0.1 mA/cm$^2$ and 1.2 mA/cm$^2$.

15. The process of claim 5, wherein the reversed oxidative current density is about 0.6 mA/cm$^2$.

16. The process of claim 5, wherein the duration of the reversed oxidative current pulses is between 1% and 100% the time of the forward reducing current pulses.

17. The process of claim 16, wherein the duration of the reversed oxidative current pulses is between 5% and 30% the time of the forward reducing current pulses.

18. The process of claim 17, wherein the duration of the reversed oxidative current pulses is about 20% the time of the forward reducing current pulses.

19. The process of claim 18, wherein the duration of the reversed oxidative current pulses is about 15% the time of the forward reducing current pulses.

20. The process of claim 19, wherein the duration of the reversed oxidative current pulses is about 30 seconds, and the duration of the forward reducing current pulses is about 150 seconds.

21. The process of claim 2, wherein the alkali metal deposits comprises dendrites.

22. The process of claim 2, wherein the alkaliation coating is discontinuous.

23. The process of claim 2, wherein the anode is a roll anode.

24. The process of claim 2, wherein the alkali metal salt is comprised of lithium chloride.

25. The process of claim 2, wherein the conductive substrate is copper or nickel.

26. The process of claim 2, wherein the alkaliation coating is comprised of graphite or silicon or blends thereof.

27. The process of claim 2, wherein the alkaliation coating is on two surfaces of the conductive substrate.

28. The process of claim 2, wherein the bare substrate area is located along the edges of the conductive substrate.

29. The process of claim 2, wherein the forward reducing current density is between 0.1 mA/cm$^2$ and 10 mA/cm$^2$.

30. The process of claim 2, wherein the forward reducing current density is about 1 mA/cm$^2$.

31. The process of claim 2, wherein the edge guard apertures are positioned above and below each exposed edge of the anode, and the edge guard comprises polyethylene.

\* \* \* \* \*